(12) United States Patent
Kang et al.

(10) Patent No.: US 12,192,622 B2
(45) Date of Patent: Jan. 7, 2025

(54) ELECTRONIC DEVICE FOR EXECUTING APPLICATIONS BY USING DIFFERENT PIECES OF CAMERA INFORMATION ACCORDING TO CAPTURING ENVIRONMENT AND METHOD FOR CONTROLLING SAME

(71) Applicant: SAMSUNG ELECTRONICS CO., LTD., Suwon-si (KR)

(72) Inventors: Changhoon Kang, Suwon-si (KR); Kwangkyu Park, Suwon-si (KR); Sangheum Cho, Suwon-si (KR); Byounggeun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 18/078,344

(22) Filed: Dec. 9, 2022

(65) Prior Publication Data

US 2023/0188840 A1    Jun. 15, 2023

Related U.S. Application Data

(63) Continuation of application No. PCT/KR2022/020043, filed on Dec. 9, 2022.

(30) Foreign Application Priority Data

Dec. 10, 2021  (KR) .................. 10-2021-0176363
Dec. 31, 2021  (KR) .................. 10-2021-0194078

(51) Int. Cl.
*H04N 23/667*    (2023.01)
*G06F 1/16*       (2006.01)
(Continued)

(52) U.S. Cl.
CPC ......... *H04N 23/667* (2023.01); *G06F 1/1618* (2013.01); *G06F 1/1652* (2013.01);
(Continued)

(58) Field of Classification Search
None
See application file for complete search history.

(56) References Cited

U.S. PATENT DOCUMENTS

2014/0184846 A1   7/2014   Yoon et al.
2014/0285476 A1   9/2014   Cho et al.
(Continued)

FOREIGN PATENT DOCUMENTS

CN    110113526 A    8/2019
CN    112579231 A    3/2021
(Continued)

OTHER PUBLICATIONS

International Search Report (PCT/ISA/210) issued by the International Searching Authority on Mar. 14, 2023 in International Patent Application No. PCT/KR2022/020043.
(Continued)

*Primary Examiner* — Paul M Berardesca
(74) *Attorney, Agent, or Firm* — Sughrue Mion, PLLC

(57) ABSTRACT

An electronic device may include: a first camera; a second camera; a memory; and at least one processor configured to: based on a request for execution of an application, obtain a query requesting information on a first specification of the first camera, based on obtaining the query, identify whether the first camera and the second camera have specifications that are different from each other, identify a capturing environment related to the electronic device, based on a result of the identification of whether the first camera and the second camera have specifications that are different from each other, based on a result of the identification of the
(Continued)

capturing environment, obtain, from the memory, the information on the first specification of the first camera or information on a second specification of the second camera, the obtained information being related to the execution of the application, and execute the application by providing the obtained information on the first specification or the obtained information on the second specification to the application.

20 Claims, 14 Drawing Sheets

(51) Int. Cl.
    *H04N 23/45*     (2023.01)
    *H04N 23/53*     (2023.01)

(52) U.S. Cl.
    CPC .......... *G06F 1/1677* (2013.01); *H04N 23/45* (2023.01); *H04N 23/531* (2023.01)

(56) References Cited

U.S. PATENT DOCUMENTS

| | | |
|---|---|---|
| 2015/0181120 A1 | 6/2015 | Tsuchida et al. |
| 2016/0050408 A1 | 2/2016 | Lee et al. |
| 2016/0337588 A1 | 11/2016 | Wei |
| 2017/0078561 A1* | 3/2017 | Wang ................ H04N 23/62 |
| 2017/0324906 A1 | 11/2017 | Kang et al. |
| 2020/0012324 A1 | 1/2020 | Sung et al. |
| 2020/0319178 A1 | 10/2020 | Kunding |
| 2020/0336661 A1 | 10/2020 | Zhang et al. |
| 2020/0356140 A1 | 11/2020 | Kim et al. |
| 2020/0389578 A1 | 12/2020 | Lee et al. |
| 2021/0018957 A1 | 1/2021 | Cho |
| 2022/0150345 A1 | 5/2022 | Woo et al. |
| 2022/0214852 A1 | 7/2022 | Kim et al. |
| 2022/0303476 A1 | 9/2022 | Jang et al. |

FOREIGN PATENT DOCUMENTS

| | | |
|---|---|---|
| CN | 112995562 A | 6/2021 |
| EP | 4 089 521 A1 | 11/2022 |
| JP | 2017-511626 A | 4/2017 |
| KR | 10-2014-0115913 A | 10/2014 |
| KR | 10-2016-0021497 A | 2/2016 |
| KR | 10-2017-0055865 A | 5/2017 |
| KR | 10-1769385 B1 | 8/2017 |
| KR | 10-2019-0139788 A | 12/2019 |
| KR | 10-2020-0005211 A | 1/2020 |
| KR | 10-2020-0032411 A | 3/2020 |
| KR | 10-2020-0129584 A | 11/2020 |
| KR | 10-2021-0017282 A | 2/2021 |
| KR | 10-2021-0101009 A | 8/2021 |
| KR | 10-2021-0102010 A | 8/2021 |
| WO | 2021/060819 A1 | 4/2021 |
| WO | 2021/141287 A | 7/2021 |
| WO | 2021/162295 A1 | 8/2021 |

OTHER PUBLICATIONS

Written Opinion (PCT/ISA/237) issued by the International Searching Authority on Mar. 14, 2023 in International Patent Application No. PCT/KR2022/020043.

Communication issued on Oct. 31, 2024 by the European Patent Office in European Patent Application No. 22904718.8.

* cited by examiner

ELECTRONIC DEVICE FOR EXECUTING APPLICATIONS BY USING DIFFERENT PIECES OF CAMERA INFORMATION ACCORDING TO CAPTURING ENVIRONMENT AND METHOD FOR CONTROLLING SAME

CROSS REFERENCE TO RELATED APPLICATIONS

This application is a Bypass Continuation of International Application No. PCT/KR2022/020043 designating the United States, filed on Dec. 9, 2022, in the Korean Intellectual Property Receiving Office and claiming priority to Korean Patent Application No. 10-2021-0176363, filed on Dec. 10, 2021, and Korean Patent Application No. 10-2021-0194078, filed on Dec. 31, 2021, the disclosures of all of which are incorporated by reference herein in their entireties.

BACKGROUND

1. Field

The disclosure relates to an electronic device for executing applications by using different pieces of camera information according to a capturing environment and a method for controlling the same.

2. Description of Related Art

Various services and additional functions provided through electronic devices, for example, portable electronic devices such as smartphones, are gradually increasing. In order to improve the usefulness of such electronic devices and to satisfy various user demands, communication service providers or electronic device manufacturers are competitively developing electronic devices to provide various functions and to be differentiated from other competitors. As a result, higher levels of various functions are provided through electronic devices.

SUMMARY

In the case of an electronic device (for example, foldable electronic device) having multiple cameras which have different characteristics (for example, available resolutions or angles of view), and the relative position between the cameras is changeable, a camera to be activated may be changed according to the state of the terminal (for example, whether the foldable electronic device is in a folded state or in an unfolded state). In this case, in order to guarantee operations of various applications implemented based on the assumption that they will be executed in a general portable terminal (for example, a bar-shape portable terminal having multiple cameras having identical camera characteristics), a foldable electronic device, for example, may provide a downgraded camera specification to an application executed in the foldable electronic device. In other words, an application queries the camera specification from a foldable electronic device (for example, camera manager module 420) by using at least one piece of camera identification information (ID) stored in the application. The foldable electronic device in which the application is executed (or an electronic device having at least one camera, the relative position between which is changed such that the at least one camera physically rotates and faces a capturing surface (for example, a virtual plane on which the subject is positioned)) has multiple pieces of camera identification information (for example, physical camera identification information). As a result, the application is provided with a downgraded camera specification to ensure that the application can operate. In addition, a specific operating system (for example, Android operating system) provides a logical multi-camera function such that multiple cameras are grouped with a single piece of camera identification information (for example, logical camera identification information). Even in this case, however, the camera specification corresponding to the single piece of identification information is downgraded, in order to ensure that the application can operate, and then provided to the application.

Various embodiments of the disclosure provide an electronic device wherein even when the electronic device (for example, camera manager module 420) is requested to provide camera specification information according to a single piece of camera identification information from an application, specification information of a camera determined according to the current state of the electronic device (for example, foldable electronic device), among multiple cameras, is provided to the application such that, instead of a downgraded specification, all specifications of the multiple cameras can be used to drive the application.

Further, various embodiments of the disclosure provide a method for controlling an electronic device wherein even when the electronic device (for example, camera manager module 420) is requested to provide camera specification information according to a single piece of camera identification information from an application, specification information of a camera determined according to the current state of the electronic device (for example, foldable electronic device), among multiple cameras, is provided to the application such that, instead of a downgraded specification, all specifications of the multiple cameras can be used to drive the application.

According to an aspect of the disclosure, an electronic device may include: a first camera; a second camera; a memory; and at least one processor configured to: based on a request for execution of an application, obtain a query requesting information on a first specification of the first camera, based on obtaining the query, identify whether the first camera and the second camera have specifications that are different from each other, identify a capturing environment related to the electronic device, based on a result of the identification of whether the first camera and the second camera have specifications that are different from each other, based on a result of the identification of the capturing environment, obtain, from the memory, the information on the first specification of the first camera or information on a second specification of the second camera, the obtained information being related to the execution of the application, and execute the application by providing the obtained information on the first specification or the obtained information on the second specification to the application.

The at least one processor may be further configured to, based identifying that the first camera and the second camera have specifications that are the same as each other, provide the information on the first specification of the first camera to the application.

The at least one processor may be further configured to, based on identifying that the first camera and the second camera have specifications that different from each other, provide the information on the second specification of the second camera to the application.

The first camera and the second camera may be grouped by a same identifier.

The capturing environment may include at least one of whether the electronic device is in a folded state or an unfolded state, positions of the first camera and the second camera configured to rotate, illuminance around the electronic device, or a zoom configuration of the first camera or the second camera.

The at least one processor may be further configured to: based the electronic device being in the folded state, execute the application based on the first specification of the first camera, based on the electronic device being in the unfolded state, execute the application based on the second specification of the second camera, and based on the first camera facing a capturing surface, execute the application based on the first specification.

The at least one processor may be further configured to, based on the electronic device being changed from the folded state to the unfolded state, obtain an image by using the second specification through the second camera, and upscale the image obtained by using the second specification to correspond to the first specification.

The electronic device may further include a third camera, and the at least one processor may be further configured to, based on an input for switching to the third camera being received while the application is executed based on the second specification of the second camera, execute the application according to a third specification of the third camera.

According to an aspect of the disclosure, an electronic device includes: a first camera; a second camera; a memory; and at least one processor configured to: identify, while an application using a first specification of the first camera is executed, that a capturing environment of the electronic device is changed from a first environment to a second environment, compare the first specification of the first camera and a second specification of the second camera, and based on a result of the comparison, execute the application by providing information on the second specification of the second camera from the memory to the application.

The at least one processor may be further configured to, based on the result of the comparison indicating that the first specification and the second specification are different from each other, provide the information on the second specification of the second camera to the application.

The first environment may include the electronic device being in a folded state, and the second environment may include the electronic device being in an unfolded state.

The first camera and the second camera may be grouped by a same identifier.

The at least one processor may be further configured to determine whether the application can be executed according to the second specification.

According to an aspect of the disclosure, a method for controlling an electronic device, includes: obtaining a request for execution of an application; based on obtaining the request for the execution, obtaining a query requesting provision of information on a first specification of a first camera of the electronic device; based on obtaining the query, identifying whether the first camera and a second camera of the electronic device have specifications that are different from each other; based on a result of the identifying whether the first camera and the second camera have specifications that are different from each other, identifying a capturing environment related to the electronic device; based on a result of the identification of the capturing environment, obtaining, from a memory of the electronic device, the information on the first specification of the first camera or information on a second specification of the second camera, the obtained information being related to the execution of the application; and executing the application by providing the obtained information on the first specification or the obtained information on the second specification to the application.

The method may further include, based on identifying that the first camera and the second camera have specifications that are the same as each other, providing the information on the first specification of the first camera to the application.

The method may further include, based on identifying that the first camera and the second camera have specifications that are different from each other, providing the information on the second specification of the second camera to the application.

The first camera and the second camera may be grouped by a same identifier.

The capturing environment may include at least one of whether the electronic device is in a folded state or an unfolded state, illuminance around the electronic device, or a zoom configuration of the first camera or the second camera.

The method may further include: based on the electronic device being in the folded state, executing the application based on the first specification of the first camera, and based on the electronic device being in the unfolded state, executing the application based on the second specification of the second camera.

The method may further include, based on the electronic device being changed from the folded state to the unfolded state, obtaining an image by using the second specification through the second camera, and upscaling the image obtained by using the second specification to correspond to the first specification.

Various embodiments of the disclosure may provide an electronic device wherein even when the electronic device (for example, camera manager module 420) is requested to provide camera specification information according to a single piece of camera identification information from an application, specification information of a camera determined according to the current state of the electronic device (for example, foldable electronic device), among multiple cameras, is provided to the application such that, instead of a downgraded specification, all specifications of the multiple cameras can be used to drive the application.

Advantageous effects according to various embodiments are not limited to the above-mentioned advantageous effects, and it is obvious those skilled in the art that various advantageous effects are incorporated in the disclosure.

BRIEF DESCRIPTION OF DRAWING

The above and other aspects, features, and advantages of certain embodiments of the present disclosure will be more apparent from the following description taken in conjunction with the accompanying drawings, in which.

DETAILED DESCRIPTION

Figure 1:
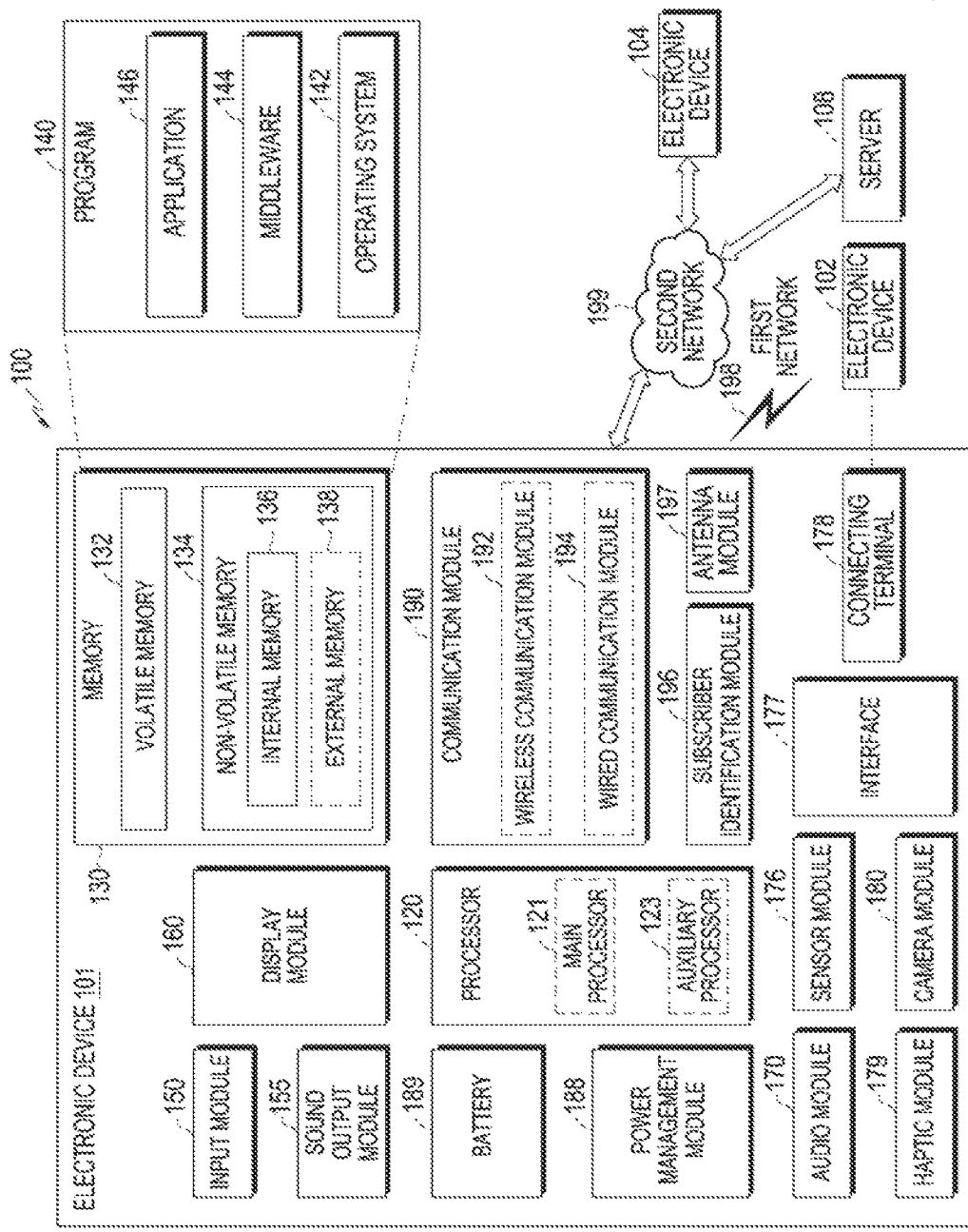
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
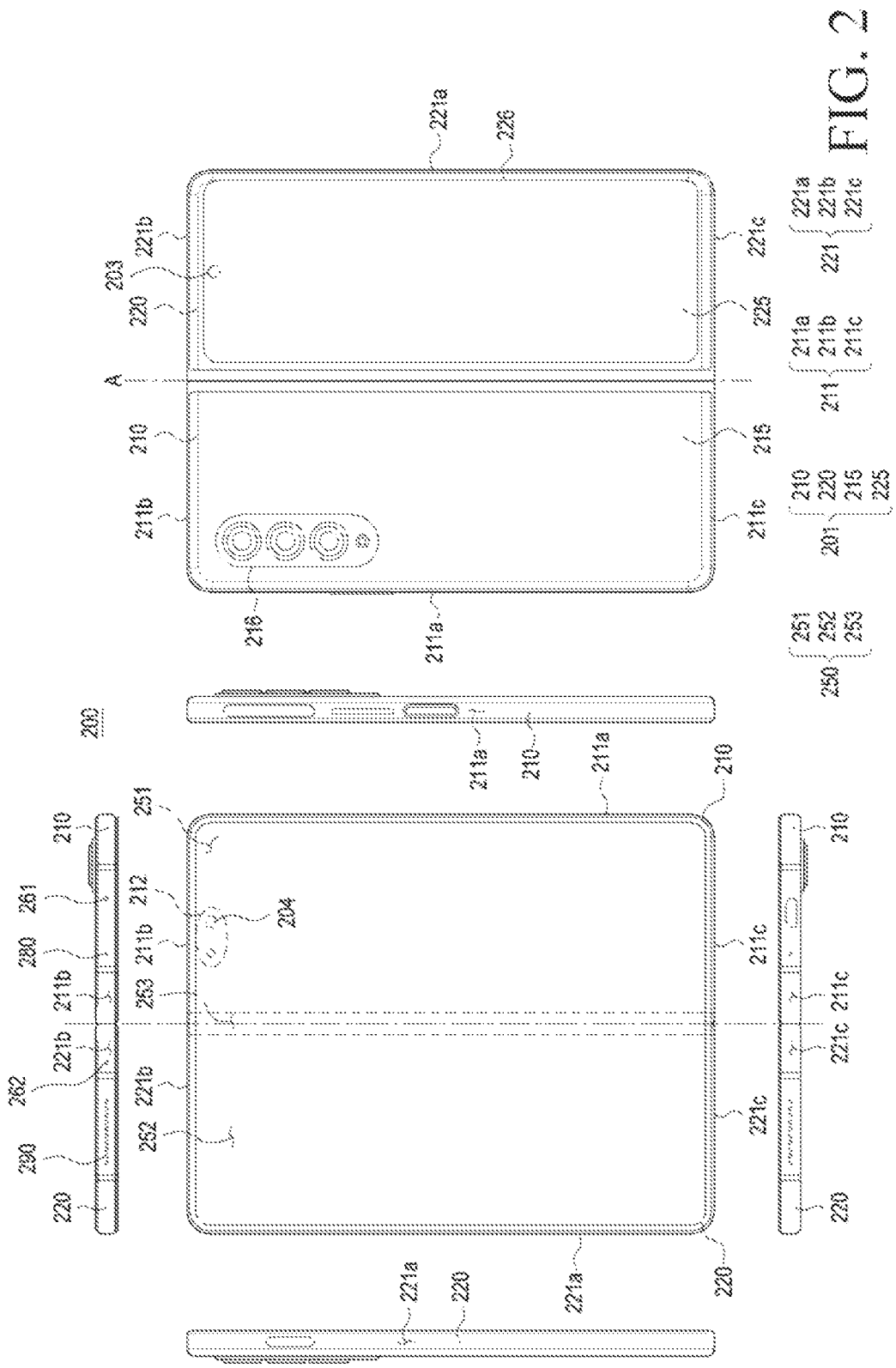
FIG. 2 is an example diagram illustrating an unfolded state of a portable device (e.g., an electronic device of FIG. 1) according to an embodiment of the disclosure.
Figure 3:
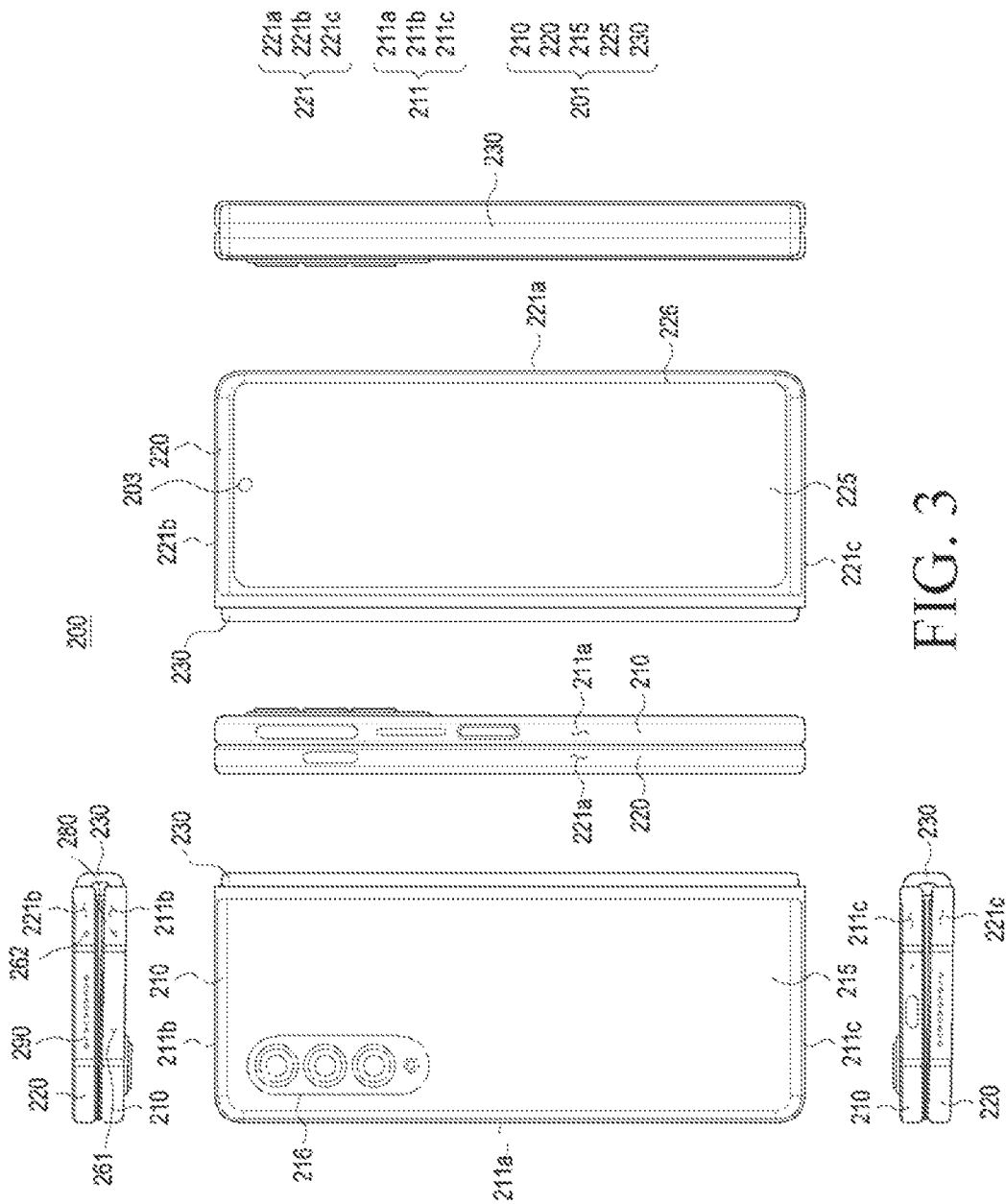
FIG. 3 is an example diagram illustrating a folded state of a portable device according to an embodiment of the disclosure.

FIG. 2 is a diagram illustrating an unfolded state of a portable device 200 (e.g., the electronic device 101 of FIG. 1) according to various embodiments of the disclosure. FIG. 3 is a diagram illustrating a folded state of the portable device 200 according to various embodiments of the disclosure. The portable device 200 may be, as an example of the electronic device 101 shown in FIG. 1, a foldable or bendable electronic device.

Referring to FIGS. 2 and 3, in an embodiment, the portable device 200 may include a foldable housing 201 and a flexible or foldable display 250 (hereinafter, abbreviated as a "flexible display" 250) (e.g., the display module 160 of FIG. 1) disposed in a space formed by the foldable housing 201. According to an embodiment, a surface on which the flexible display 250 is disposed (or a surface on which the flexible display 250 is viewed from the outside of the portable device 200) may be defined as a front surface of the portable device 200. In addition, an opposite surface to the front surface may be defined as a rear surface of the portable device 200. In addition, a surface surrounding a space between the front surface and the rear surface may be defined as a side surface of the portable device 200.

According to various embodiments, the foldable housing 201 may include a first housing 210 including a sensor area 212, a second housing 220, a first rear cover 215, a second rear cover 225, and a hinge assembly 230. The hinge assembly 230 may include a hinge cover (e.g., a hinge cover 232 of FIG. 5) which covers a foldable portion of the foldable housing 201. The foldable housing 201 of the portable device 200 is not limited to the shape and coupling shown in FIGS. 2 and 3, and may be implemented by a combination and/or coupling of other shapes or parts. For example, in another embodiment, the first housing 210 and the first rear cover 215 may be integrally configured, and the second housing 220 and the second rear cover 225 may be integrally configured.

According to various embodiments, an illuminance sensor and an image sensor (e.g., a second camera 204) may be disposed in the sensor area 212. The illuminance sensor may detect the amount of light around the portable device 200, and the image sensor may convert light incident through a camera lens into a digital signal. The illuminance sensor and the image sensor may be visually exposed to the flexible display 250. According to another embodiment, the illuminance sensor and the image sensor may not be visually exposed. For example, a camera may be configured as an under display camera (UDC). A pixel in one area of the flexible display 250 corresponding to a position of the UDC is configured differently from a pixel in another area thereof, so that the image sensor and/or the camera may not be visually exposed.

According to various embodiments, the first housing 210 may be connected to the hinge assembly 230, and include a first front surface facing in a first direction and a first rear surface facing in an opposite direction to the first direction. The second housing 220 may be connected to the hinge assembly 230, and include a second front surface facing in a second direction and a second rear surface facing in an opposite direction to the second direction. The second housing 220 may rotate with respect to the first housing 210 around the hinge assembly 230. The portable device 200 may change to a folded state or an unfolded state. According to an embodiment of the disclosure, a first camera 203 may be provided in the second housing 220.

According to various embodiments, the first housing 210 may include a first side surface 211a disposed between the first front surface and the first rear surface, and spaced apart from and in parallel to a folding axis A of the hinge assembly 230, and the second housing 220 may include a second side surface 221a disposed between the second front surface and the second rear surface, and spaced apart from and in parallel to the folding axis A of the hinge assembly 230. In addition, the first housing 210 may include a third side surface 211b perpendicular to the first side surface 211a, and having one end connected to the first side surface 211a and the other end connected to the hinge assembly 230, and a fourth side surface 211c perpendicular to the first side surface 211a, having one end connected to the first side surface 211a and the other end connected to the hinge assembly 230, and spaced apart in a direction parallel to the third side surface 211b. The second housing 220 may include a fifth side surface 221b perpendicular to the second side surface 221a, and having one end connected to the second side surface 221a and the other end connected to the hinge assembly 230, and a sixth side surface 221c perpendicular to the second side surface 221a, having one end connected to the second side surface 221a and the other end connected to the hinge assembly 230, and spaced apart in a direction parallel to the fifth side surface 221b. When the second housing 220 is folded with respect to the first housing 210 around the hinge assembly 230, the first side surface 211a may come closer to the second side surface 221a, and when the second housing 220 is unfolded with respect to the first housing 210 around the hinge assembly 230, the first side surface 211a and the second side surface 221a may move away from each other.

According to an embodiment, in a fully folded state of the portable device 200, the first front surface and the second front surface may face each other, and in a fully unfolded state, the second direction may be the same as the first direction. In the fully unfolded state, a distance between the first side surface 211a and the second side surface 221a may be configured to be farthest.

According to various embodiments, the first housing 210 and the second housing 220 may be disposed on opposite sides of the folding axis A, and may have an overall symmetrical shape with respect to the folding axis A. As described later, an angle or distance between the first housing 210 and the second housing 220 may be different according to whether a state of the portable device 200 is an unfolded state, a folded state, or a partially unfolded (or partially folded) intermediate state.

According to various embodiments, as shown in FIG. 2, the first housing 210 and the second housing 220 may together form a recess which receives the flexible display 250. According to various embodiments, at least portions of the first housing 210 and the second housing 220 may be formed of a metal material or a non-metal material having rigidity of a size selected to support the flexible display 250. The at least portions formed of the metal material may provide a ground plane of the portable device 200, and may be electrically connected to a ground line formed on a printed circuit board disposed inside the foldable housing 201.

According to various embodiments, a protective member may be disposed on the outer perimeter of the flexible display 250. The protective member may be configured integrally with a side surface of the foldable housing 201 or as a separate structure. The flexible display 250 may not be adhered to the side surface of the foldable housing 201 and/or the protective member. A gap may be configured between the flexible display 250 and the protective member. The protective member may be configured to cover an internal configuration of the portable device 200 from the outside or to protect the internal configuration of the portable device 200 from an external impact. According to an embodiment, the protective member may be configured to cover a wiring mounted in the flexible display 250 from the outside or to protect the wiring from an external impact.

According to various embodiments, the first rear cover 215 may be disposed on one side of the folding axis A on the rear surface of the portable device 200, and may have, for example, a substantially rectangular periphery, and the periphery may be surrounded by the first housing 210. Similarly, the second rear cover 225 may be disposed on the other side of the folding axis A on the rear surface of the portable device 200, and the periphery of the second rear cover may be surrounded by the second housing 220.

According to various embodiments, the first rear cover 215 and the second rear cover 225 may have a substantially symmetrical shape around the folding axis A. However, the first rear cover 215 and the second rear cover 225 do not necessarily have a mutually symmetrical shape, and in another embodiment, the portable device 200 may include the first rear cover 215 and the second rear cover 225 having various shapes. In another embodiment, the first rear cover 215 may be configured integrally with the first housing 210, and the second rear cover 225 may be configured integrally with the second housing 220.

According to various embodiments, the first rear cover 215, the second rear cover 225, the first housing 210, and the second housing 220 may form a space in which various components (e.g., a printed circuit board or a battery) of the portable device 200 may be disposed. According to an embodiment, one or more components may be disposed on the rear surface of the portable device 200 or visually exposed. For example, one or more components or a sensor may be visually exposed through a first rear area 216 of the first rear cover 215. In various embodiments, the sensor may include a proximity sensor and/or a rear camera. In another embodiment, at least a portion of a sub-display may be visually exposed through a second rear area 226 of the second rear cover 225.

According to various embodiments, a front camera disposed on a front surface (e.g., a second front surface) of the portable device 200 or a rear camera exposed through the first rear area 216 of the first rear cover 215 may include one or more lenses, an image sensor, and/or an image signal processor. A flash may include, for example, a light-emitting diode or a xenon lamp. In some embodiments, two or more lenses (an infrared camera, and wide angle and telephoto lenses) and image sensors may be disposed on one surface of the portable device 200.

Referring to FIG. 3, a hinge cover (e.g., the hinge cover 232 of FIG. 5) included in the hinge assembly 230 may be disposed between the first housing 210 and the second housing 220 and configured to cover an internal component (e.g., the hinge assembly 230). According to an embodiment, the hinge assembly 230 may be covered by portions of the first housing 210 and the second housing 220 or may be exposed to the outside according to a state (an unfolded state, an intermediate state, or a folded state) of the portable device 200.

According to an embodiment, as shown in FIG. 2, when the portable device 200 is in an unfolded state (e.g., a fully unfolded state), the hinge assembly 230 may not be exposed since the same is covered by the first housing 210 and the second housing 220. For another example, as shown in FIG. 3, when the portable device 200 is in a folded state (e.g., a fully folded state), the hinge assembly 230 may be exposed to the outside between the first housing 210 and the second housing 220. For another example, when the first housing 210 and the second housing 220 are in an intermediate state that is folded with a certain angle, the hinge assembly 230 may be partially exposed to the outside between the first housing 210 and the second housing 220. However, in this case, the exposed area may be smaller than that in the fully folded state. In an embodiment, the hinge assembly 230 may include a curved surface.

According to various embodiments, the flexible display 250 may be disposed in a space formed by the foldable housing 201. For example, the flexible display 250 may be seated on a recess formed by the foldable housing 201, and may be viewed from the outside through the front surface (e.g., the first front surface and/or the second front surface) of the portable device 200. According to an embodiment, the flexible display 250 may configure most of the front surface (e.g., the first front surface and/or the second front surface) of the portable device 200. Accordingly, the front surface (e.g., the first front surface and/or the second front surface) of the portable device 200 may include the flexible display 250, and a partial area of the first housing 210 and a partial area of the second housing 220, which are adjacent to the flexible display 250. In addition, the rear surface (e.g., the first rear surface and/or the second rear surface) of the portable device 200 may include the first rear cover 215, a partial area of the first housing 210 adjacent to the first rear cover 215, the second rear cover 225, and a partial area of the second housing 220 adjacent to the second rear cover 225.

According to various embodiments, the flexible display 250 may refer to a display in which at least a partial area may be deformed into a flat surface or a curved surface. According to an embodiment, the flexible display 250 may include a folding area 253, a first area 251 disposed on one side (e.g., a right side of the folding area 253 shown in FIG. 2) with reference to the folding area 253, and a second area 252 disposed on the other side (e.g., a left side of the folding area 253 shown in FIG. 2).

However, the division of areas of the flexible display 250 shown in FIG. 2 is an example, and the display 250 may be divided into multiple (e.g., two, or four or more) areas according to a structure or a function. For example, in the embodiment shown in FIG. 2, an area of the flexible display 250 may be divided by the folding area 253 extending parallel to the folding axis A, but in another embodiment, an area of the flexible display 250 may be divided with reference to another folding axis (e.g., a folding axis parallel to a width direction of the electronic device).

According to various embodiments of the disclosure, the flexible display 250 may be coupled to or disposed adjacent to a touch panel having a touch sensing circuit and a pressure sensor capable of measuring the intensity (pressure) of a touch. For example, the flexible display 250 may be coupled to or disposed adjacent to, as an example of a touch panel, a touch panel which detects an electromagnetic resonance (EMR) type stylus pen.

According to various embodiments, the first area 251 and the second area 252 may have an overall symmetrical shape with respect to the folding area 253.

Hereinafter, operations of the first housing 210 and the second housing 220 according to a state (e.g., a folded state, an unfolded state, or an intermediate state) of the portable device 200 and each area of the flexible display 250 will be described.

According to various embodiments, when the portable device 200 is in an unfolded state (e.g., FIG. 2), the first housing 210 and the second housing 220 may face the same direction while forming an angle of 180 degrees. A surface of the first area 251 and a surface of the second area 252 of the flexible display 250 may form 180 degrees with each other, and face the same direction (e.g., a front direction of the electronic device). In this case, the folding area 253 may form the same plane as the first area 251 and the second area 252.

According to various embodiments, when the portable device 200 is in a folded state (e.g., FIG. 3), the first housing 210 and the second housing 220 may face each other. The surface of the first area 251 and the surface of the second area 252 of the flexible display 250 may face each other while forming a narrow angle (e.g., between 0 degrees and 10 degrees) with each other. At least a portion of the folding area 253 may be formed of a curved surface having a predetermined curvature.

According to various embodiments, when the portable device 200 is in an intermediate state, the first housing 210 and the second housing 220 may at a certain angle with respect to each other. The surface of the first area 251 and the surface of the second area 252 of the flexible display 250 may form an angle greater than that in the folded state and smaller than that in the unfolded state. At least a portion of the folding area 253 may be formed of a curved surface having a predetermined curvature, and the curvature in this case may be smaller than that in the folded state.

Figure 4A:
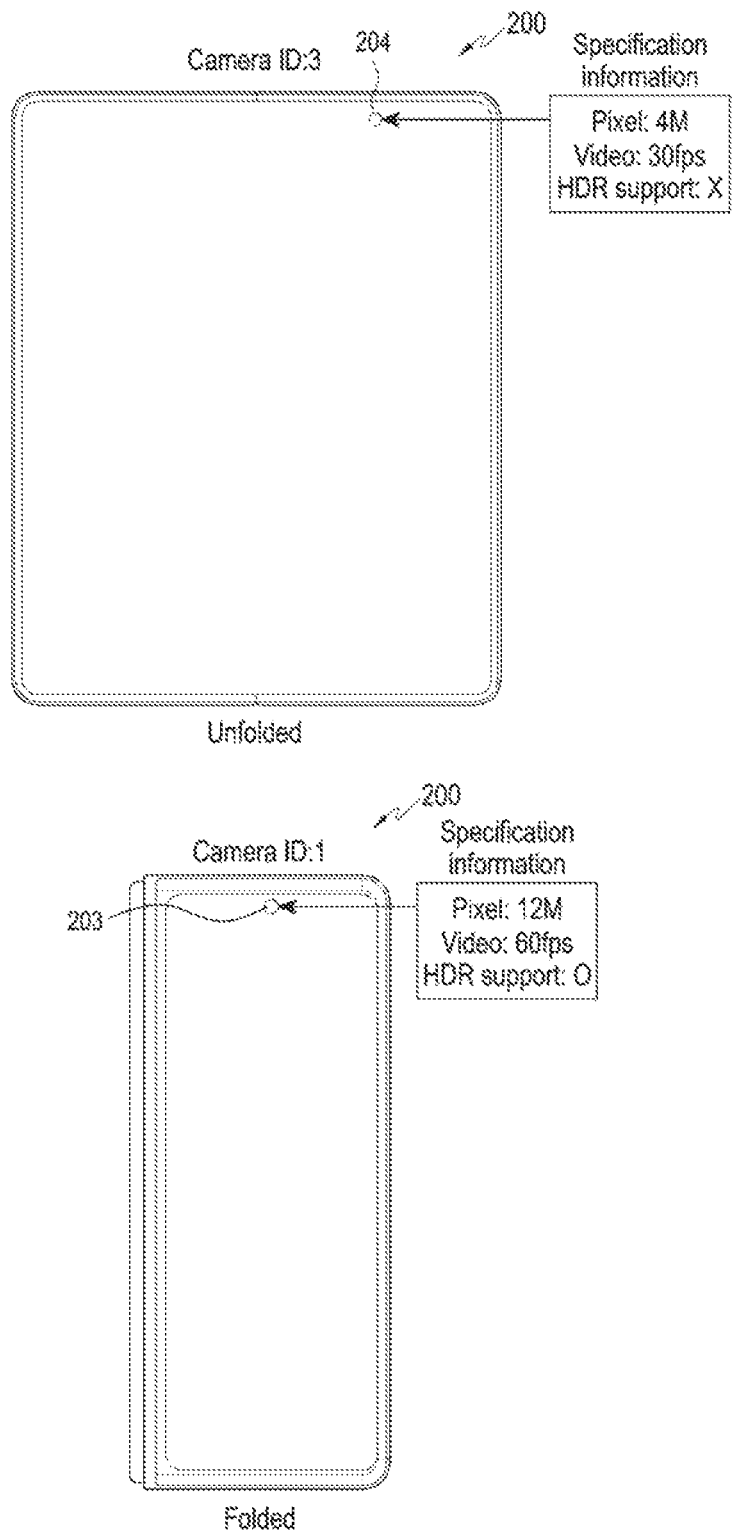
FIG. 4A is an example diagram illustrating a first specification of a first camera 203 and a second specification of a second camera 204 according to an embodiment of the disclosure.
Figure 4B:
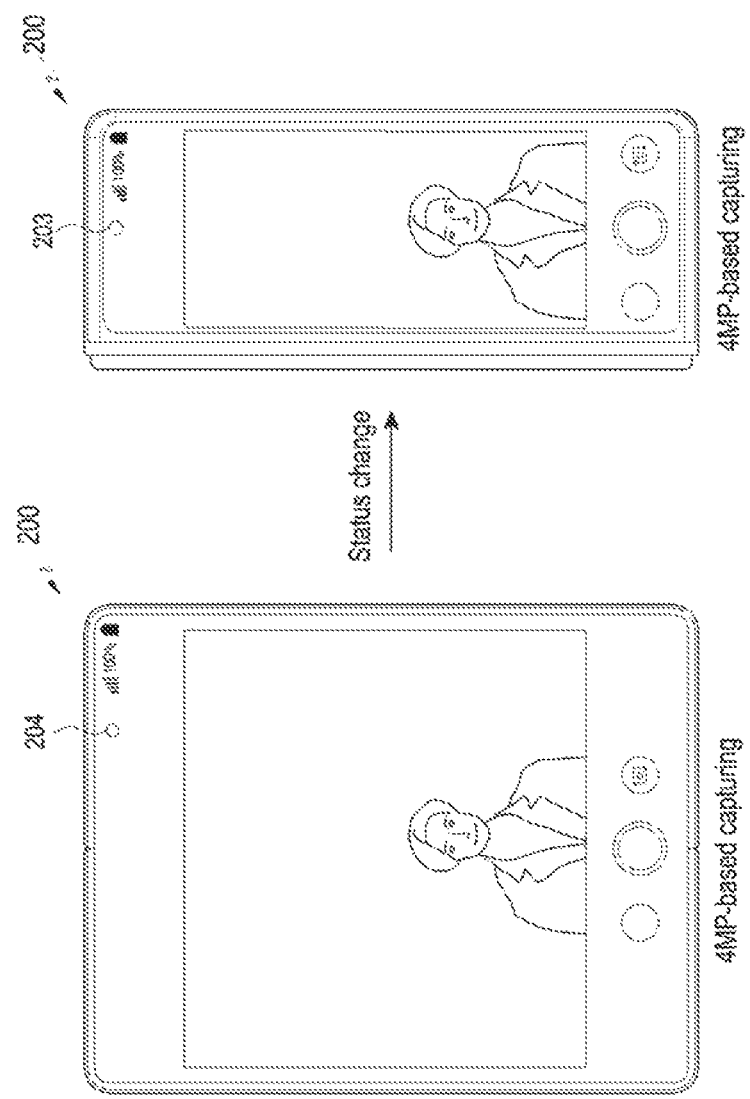
FIG. 4B is an example diagram illustrating a function or an operation of executing an application (e.g., a camera application) according to a related art by using a first camera 203 and a second camera 204, in a portable device (e.g., a foldable electronic device).
Figure 4C:
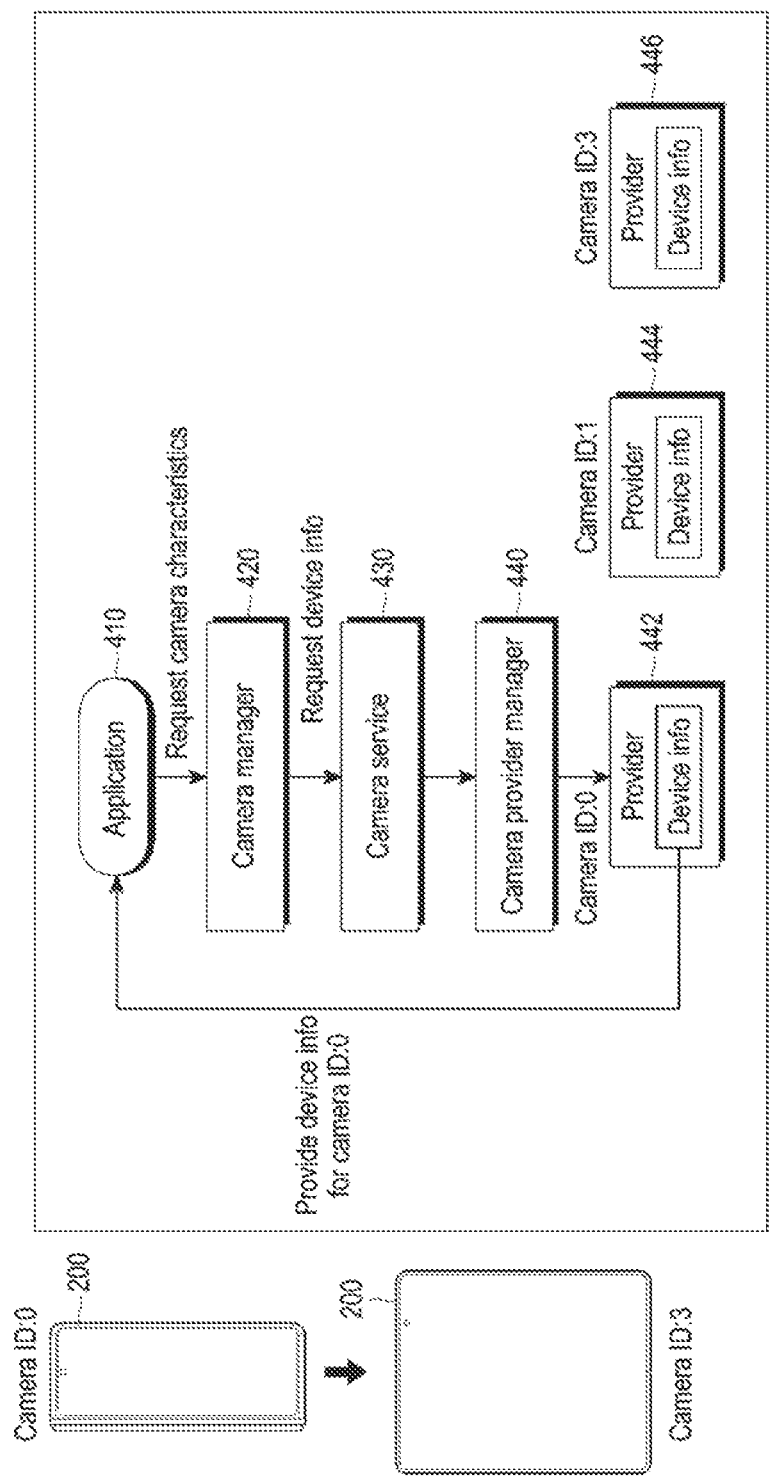
FIG. 4C is an example diagram illustrating a function or an operation in which information on a specification of a specific camera is provided to an application according to a related art, in a portable device (e.g., a foldable electronic device).

FIG. 4A is an example diagram illustrating a first specification of the first camera 203 and a second specification of the second camera 204 according to an embodiment of the disclosure. FIG. 4B is an example diagram illustrating a function or an operation of executing an application (e.g., a camera application) according to a related art by using the first camera 203 and the second camera 204 in a portable device (e.g., a foldable electronic device). FIG. 4C is an example diagram illustrating a function or an operation in which information on a specification of a specific camera is provided to an application according to a related art in a portable device (e.g., a foldable electronic device).

Referring to FIG. 4A, the first camera 203 according to an embodiment of the disclosure may be, for example, a camera which has 12 megapixels and 60 frames per second (FPS), and supports high dynamic range (HDR). In addition, the second camera 204 according to an embodiment of the disclosure may be, for example, a camera which has 4 megapixels and 30 frames per second (FPS), and does not support high dynamic range (HDR). According to an embodiment of the disclosure, physical identification information of the first camera 203 may be configured to be 1, and physical identification information of the second camera 204 may be configured to be 3.

According to the related art, as shown in FIG. 4B, a camera which obtains an image may also be changed (e.g., changed from the second camera 204 to the first camera 203) according to a change in a state of the portable device 200 (e.g., a change from an unfolded state to a folded state), but an application (e.g., a camera application) being executed in the portable device 200 may query the portable device 200 (e.g., the processor 120 of FIG. 1 and/or a camera manager module 420) for information on a camera specification by using single camera identification information (e.g., "3" as camera identification information). Accordingly, although the camera which obtains the image has been changed from the second camera 204 to the first camera 203, the portable device 200 (e.g., the processor 120 of FIG. 1 and/or the camera manager module 420) having obtained the query may provide, in response to the query, information on a specification of the second camera 204 having a lower specification than that of the first camera 203 with respect to the application being executed. Accordingly, there is a problem in that the portable device 200 does not completely use a specification of the first camera 203 but partially (e.g., only partially or with a low specification) uses the specification to execute an application. When such a related art is described again with reference to FIG. 4C, in a case where it is identified that a state of the portable device 200 is changed, an application 410 may request (e.g., query) camera characteristics from the camera manager module 420. In this case, the query may include camera identification information stored in association with an application 412 (e.g., "0" as camera identification information). According to the related art, the camera manager module 420 having been requested for the camera characteristics may request a camera service module 430 to provide information (e.g., device info) on a camera specification. According to the related art, the camera service module 430 having been requested to provide the information (e.g., device info) on the camera specification may request a camera provider manager module 440 to provide the information (e.g., device info) on the camera specification. However, in this case, the camera identification information requested from the application 410 is "0", and thus, among a first provider module 442 configured to provide a camera specification corresponding to "0" as camera identification information, a second provider module 444 configured to provide a camera specification corresponding to "1" as camera identification information, and a third provider module 446 configured to provide a camera specification corresponding to "3" as camera identification information, the camera provider manager module 440 may request the first provider module 442 to provide the information (e.g., device info) on the camera specification. In this case, the first provider module 442 having been requested to provide the information (e.g., device info) on the camera specification may provide, to the application 410, information on a camera specification corresponding to "0" as physical camera identification information. As such, despite the camera which obtains the image has been changed (e.g., changed from the first camera 203 to the second camera 204), information on a specification of a camera (e.g., the first camera 203) different from a camera currently obtaining an image may be provided to the application 410 having queried the information on the camera specification. A specification of a camera according to an embodiment of the disclosure may include information as shown in Table 1 below.

TABLE 1

| | |
|---|---|
| Picture Size | Image size for each format which can be captured |
| Active Array | Maximum resolution of sensor |
| Flash | Flash presence/absence and operation information |
| Orientation | Mounting direction of sensor |
| OIS | Presence/absence of anti-shake function when capturing image |
| VDIS | Presence/absence of anti-shake function when recording video |
| Max Zoom ratio | Maximum zoom magnification (including optical and digital zoom) |
| Lens Facing | Display contrast direction of camera |
| HDR | Whether high dynamic range is supported or not |
| AutoFocus | Whether AutoFocus is supported |
| Fps | Supportable Fps information |

Figure 5:
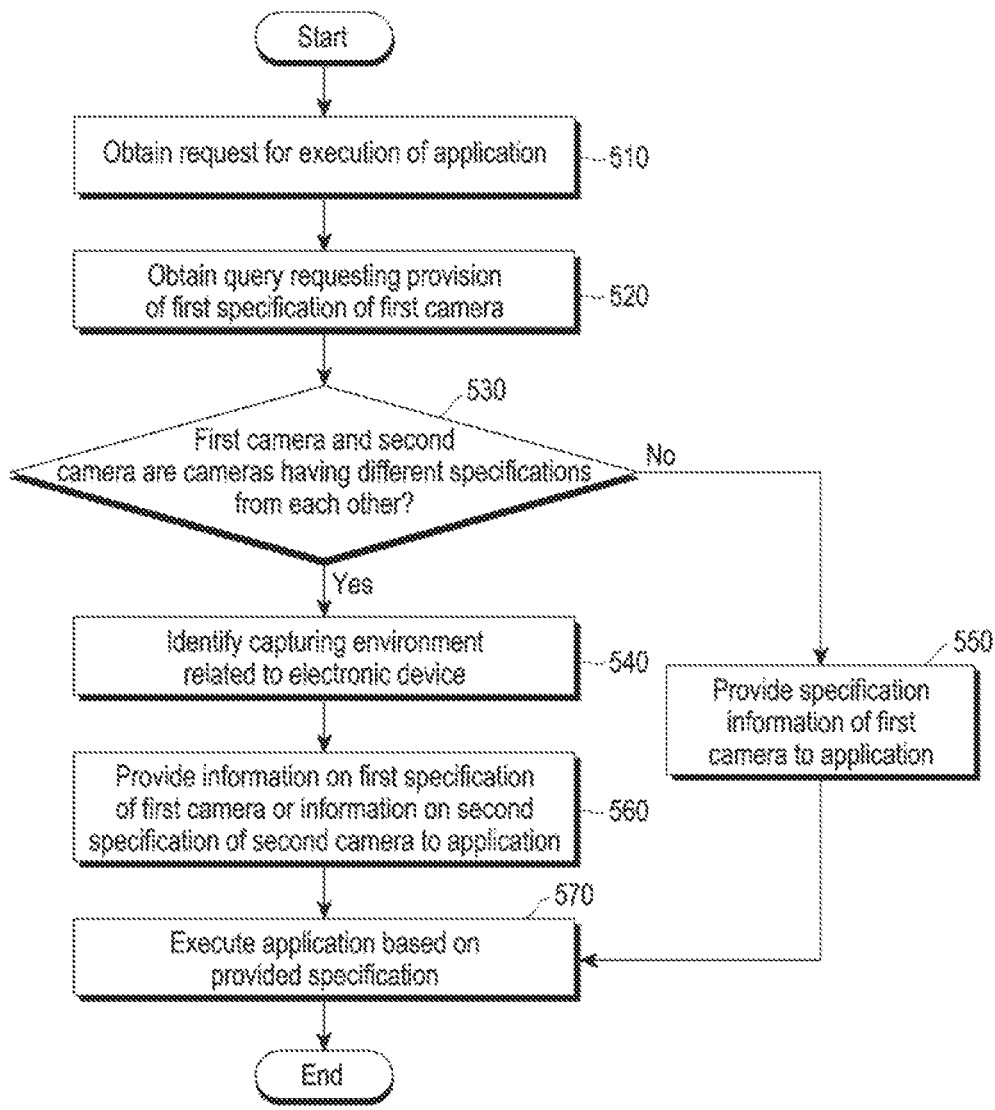
FIG. 5 is an example diagram illustrating a function or an operation of, when an execution request for an application (e.g., a camera application) is obtained, providing, to the application, specification information of a camera determined based on a current state of a portable device, according to an embodiment of the disclosure.
Figure 6:
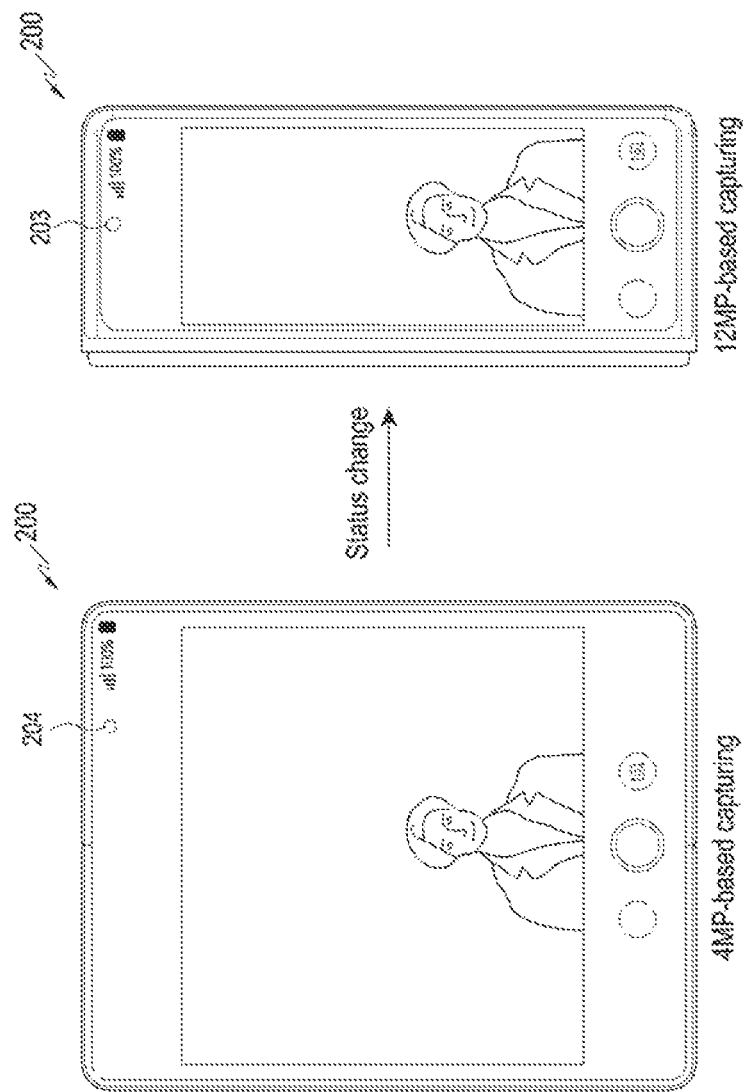
FIG. 6 is an example diagram illustrating a function or an operation of executing an application based on a first specification of a first camera when a capturing environment is changed while the application is executed based on a second specification of a second camera, in a portable terminal according to an embodiment of the disclosure.

FIG. 5 is an example diagram illustrating a function or an operation of, when an execution request for the application 410 (e.g., a camera application) is obtained, providing, to the application 410, specification information of a camera determined based on a current state of the portable device 200, according to an embodiment of the disclosure. FIG. 6 is an example diagram illustrating a function or an operation of executing an application based on a first specification of a first camera when a capturing environment is changed while the application is executed based on a second specification of the second camera 204, in the portable device 200 according to an embodiment of the disclosure.

Referring to FIG. 5, in operation 510, the electronic device 101 (e.g., the portable device 200 and/or the processor 120 of FIG. 1) according to an embodiment of the disclosure may obtain a request for execution of the application 410. For example, the electronic device 101 according to an embodiment of the disclosure may obtain an execution request for executing a specific application 410 (e.g., a camera application) via a user input such as a user's touch input for an icon corresponding to the application.

In operation 520, the electronic device 101 according to an embodiment of the disclosure may obtain a query requesting provision of a first specification of the first camera 203. The electronic device 101 (e.g., the processor 120 and/or the camera manager module 420) according to an embodiment of the disclosure may obtain, from the application 410, a query requesting provision of information on a specification of one camera (e.g., the first camera 203) among multiple cameras disposed in the electronic device 101. Although shown as an operation of obtaining the query requesting provision of the first specification of the first camera 203 in FIG. 5, according to another embodiment of the disclosure, the operation may be replaced with an operation of obtaining a query requesting provision of a second specification of the second camera 204. The application 410 (e.g., the electronic device 101) according to an embodiment of the disclosure may provide camera identification information (e.g., "0" as camera identification information) stored in the electronic device 101 in association with the application 410 to the camera manager module 420, so as to perform operation 520.

In operation 530, the electronic device 101 according to an embodiment of the disclosure may determine whether the first camera 203 and the second camera 204 are cameras having different specifications from each other, based on obtaining the query according to operation 520. The first camera 203 and the second camera 204 according to an embodiment of the disclosure may be grouped by the same identifier (e.g., "1" as an identifier). In other words, the first camera 203 and the second camera 204 according to an embodiment of the disclosure are logically one camera, but may be physically two cameras. For this reason, in relation to camera identification information stored (e.g., stored in a file system) in the electronic device 101 in association with the application 412, only one piece of the identification information may be obtained by the electronic device 101 (e.g., the application 412 and/or the processor 120).

In operation 540, when the first camera 203 and the second camera 204 are cameras having different specifications from each other (operation 530—Yes), the electronic device 101 according to an embodiment of the disclosure may identify a capturing environment related to the electronic device 101. The capturing environment according to an embodiment of the disclosure may include at least one of whether the electronic device 101 is in a folded state or an unfolded state, illuminance around the electronic device 101, or a zoom configuration of the first camera 203 or the second camera 204. Through operation 540, the electronic device 101 according to an embodiment of the disclosure may identify a camera in an active state (e.g., an enabled state) or a camera which is to be in an active state. In operation 560, when the first camera 203 and the second camera 204 are cameras having identical specifications as each other (operation 530—No), the electronic device 101 according to an embodiment of the disclosure may provide specification information of the first camera to an application.

In operation 560, the electronic device 101 according to an embodiment of the disclosure may provide information on the first specification of the first camera 203 or information on the second specification of the second camera 204 to the application 410, based on the capturing environment identified in operation 540. For example, when it is identified that the electronic device 101 is in an unfolded state, the second camera 204 is a camera in an active state or a camera which is to be in an active state, and thus the electronic device 101 according to an embodiment of the disclosure may provide the information (e.g., second specification information) on the specification of the second camera 204 to the application 410. Alternately, for example, when it is identified that the electronic device 101 is in a folded state, the first camera 203 is a camera in an active state or a camera which is to be in an active state, and thus the electronic device 101 according to an embodiment of the disclosure may provide the information (e.g., first specification information) on the specification of the first camera 203 to the application 410. According to another embodiment of the disclosure, when it is identified that the electronic device 101 is in a folded state, instead of the first specification information, information on a specification of the rear camera at least partially exposed through the first rear area 216 may be provided to the application 410.

In operation 570, the electronic device 101 according to an embodiment of the disclosure may execute the application 410, based on the specification information provided to the application 410. Accordingly, even when the electronic device 101 (e.g., the camera manager module 420) receives a request for providing of camera specification information according to single camera identification information from the application 410, the electronic device 101 may provide specification information of a camera determined according to a current state of the electronic device 101, among multiple cameras, to the application, so that the electronic device 101 capable of executing the application 410 by using all specifications of the multiple cameras rather than a downward-standardized specification can be provided. For example, as shown in FIG. 6, when a state of the electronic device 101 is changed while obtaining an image by using the second camera 204 having a relatively low specification, the electronic device 101 may obtain an image by using a specification of the first camera 203 having a relatively high specification, so as to enable provision of the electronic device 101 capable of fully using a resource of the electronic device 101.

Figure 7:
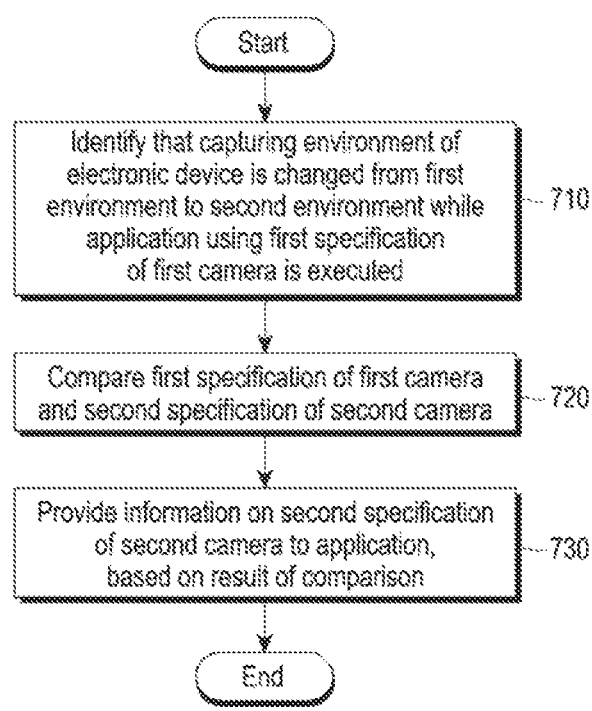
FIG. 7 is an example diagram illustrating a function or an operation of, while an application (e.g., a camera application) is executed, providing, to the application, specification information of a camera determined based on a current state of a portable device, according to an embodiment of the disclosure.

FIG. 7 is an example diagram illustrating a function or an operation of, while an application (e.g., a camera application) is executed, providing, to the application, specification information of a camera determined based on a current state of a portable device, according to an embodiment of the disclosure.

Referring to FIG. 7, in operation 710, the electronic device 101 according to an embodiment of the disclosure may identify that a capturing environment of the electronic device 101 is changed from a first environment to a second environment while the application 412 using a first specification of the first camera 203 is executed. For example, the electronic device 101 according to an embodiment of the disclosure may identify that the electronic device 101 is changed from a folded state (e.g., the first environment) to an unfolded state (e.g., the second environment) while a camera application is executed.

In operation 720, the electronic device 101 according to an embodiment of the disclosure may compare a specification of the first camera 203 and a specification of the second camera 204. The first camera 203 and the second camera 204 according to an embodiment of the disclosure may be grouped by the same identifier (e.g., "1" as an identifier). In other words, the first camera 203 and the second camera 204 according to an embodiment of the disclosure are logically one camera, but may be physically two cameras. For this reason, in relation to camera identification information stored (e.g., stored in a file system) in the electronic device 101 in association with the application 412, only one piece of the identification information may be stored.

In operation 730, the electronic device 101 according to an embodiment of the disclosure may provide information on a second specification of the second camera 204 to the application 410, based on a result of the comparison in operation 720. For example, when it is identified that the electronic device 101 is in an unfolded state, the second camera 204 is a camera in an active state or a camera which is to be in an active state, and thus the electronic device 101 according to an embodiment of the disclosure may provide the information (e.g., second specification information) on the specification of the second camera 204 to the application 410. Accordingly, even when the electronic device 101 (e.g., the camera manager module 420) receives a request for providing of camera specification information according to single camera identification information from the application 410, the electronic device 101 may provide specification information of a camera determined according to a current state of the electronic device 101, among multiple cameras, to the application, so that the electronic device 101 capable of executing the application 410 by using all specifications of the multiple cameras, rather than a downward-standardized specification, can be provided.

Figure 8:
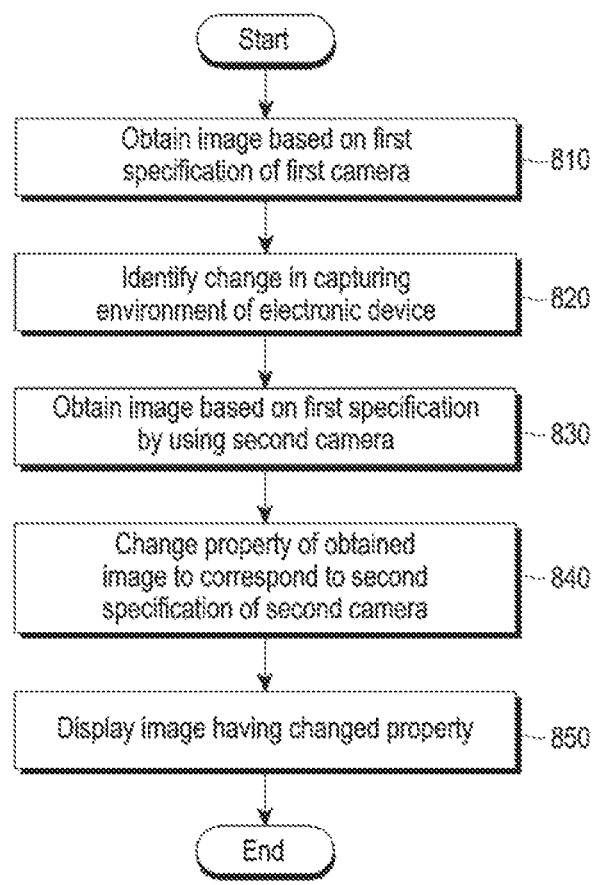
FIGS. 8 and 9 are example diagrams illustrating a function or an operation of changing a property (e.g., resolution) of an image obtained by a camera (e.g., a second camera) of a portable device, and executing an application based on the image having the changed property, according to an embodiment of the disclosure.
Figure 9:
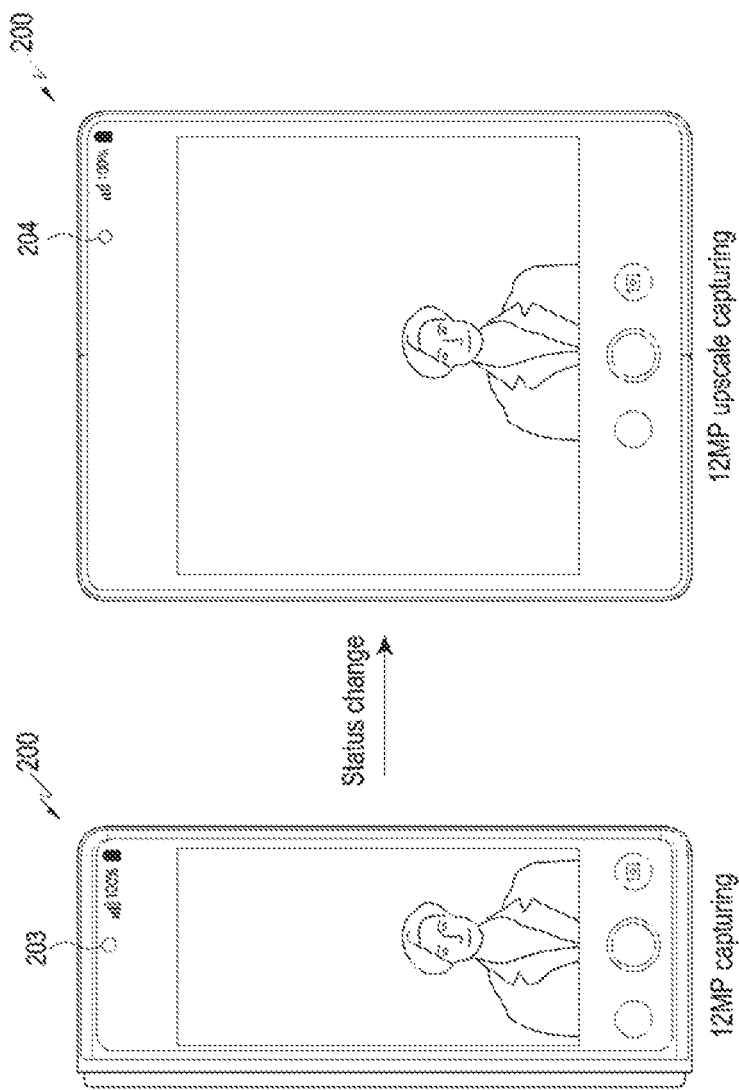

FIGS. 8 and 9 are example diagrams illustrating a function or an operation of changing a property (e.g., resolution)

of an image obtained by a camera (e.g., the second camera 204) of the electronic device 101, and executing an application based on the image having the changed property, according to an embodiment of the disclosure.

Referring to FIG. 8, in operation 810, the electronic device 101 according to an embodiment of the disclosure may obtain an image, based on a first specification of the first camera 203. For example, the electronic device 101 according to an embodiment of the disclosure may obtain an image by using the first camera 203 in a state in which the electronic device 101 is folded.

In operation 820, the electronic device 101 according to an embodiment of the disclosure may identify a change in a capturing environment of the electronic device 101. The capturing environment according to an embodiment of the disclosure may include at least one of whether the electronic device 101 is in a folded state or an unfolded state, illuminance around the electronic device 101, or a zoom configuration of the first camera 203 or the second camera 204. Through operation 820, the electronic device 101 according to an embodiment of the disclosure may identify a camera in an active state (e.g., an enabled state) or a camera which is to be in an active state.

In operation 830, when the electronic device 101 is changed from a folded state to an unfolded state, the electronic device 101 according to an embodiment of the disclosure may obtain an image based on a second specification of the second camera 204 by using the second camera 204. For example, the electronic device 101 according to an embodiment of the disclosure may obtain a 4 megapixel-based image.

In operation 840, the electronic device 101 according to an embodiment of the disclosure may change a property of the obtained image to correspond to the first specification of the first camera. In operation 850, the electronic device 101 according to an embodiment of the disclosure may display the image having the changed property. For example, the electronic device 101 according to an embodiment of the disclosure may perform an up-scaling function or operation of increasing resolution of the obtained image. The electronic device 101 according to an embodiment of the disclosure may display an up-scaled image. Accordingly, the electronic device 101 according to an embodiment of the disclosure may obtain an image having substantially the same property as an image obtained before a state change of the electronic device 101 without updating a camera specification according to a state change of the electronic device 101.

Figure 10:
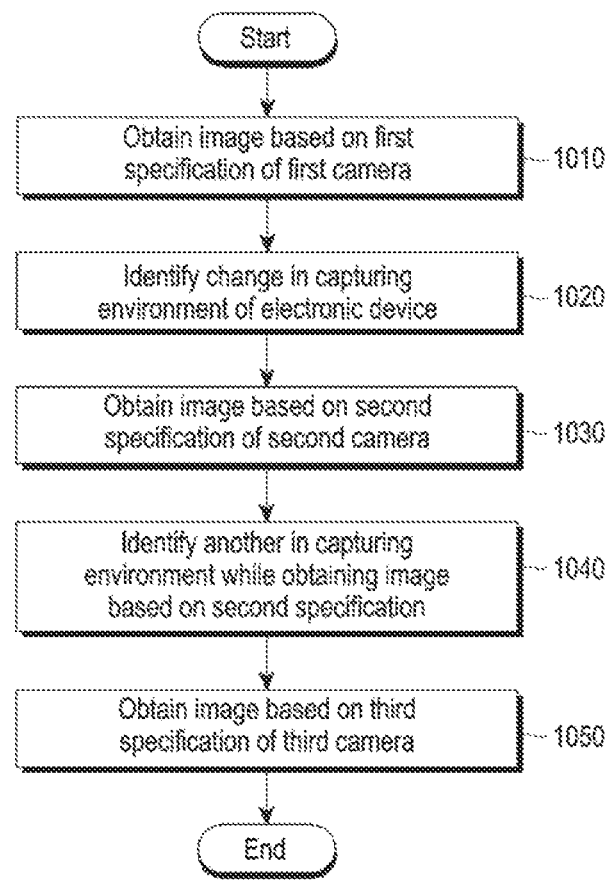
FIGS. 10 and 11 are example diagrams illustrating a function or an operation of, when a portable device includes three or more cameras, executing an application based on a specification of each of the three or more cameras according to a change in a capturing environment even when a request for providing camera specification information according to single camera identification information is obtained from the application, according to an embodiment of the disclosure.
Figure 11:
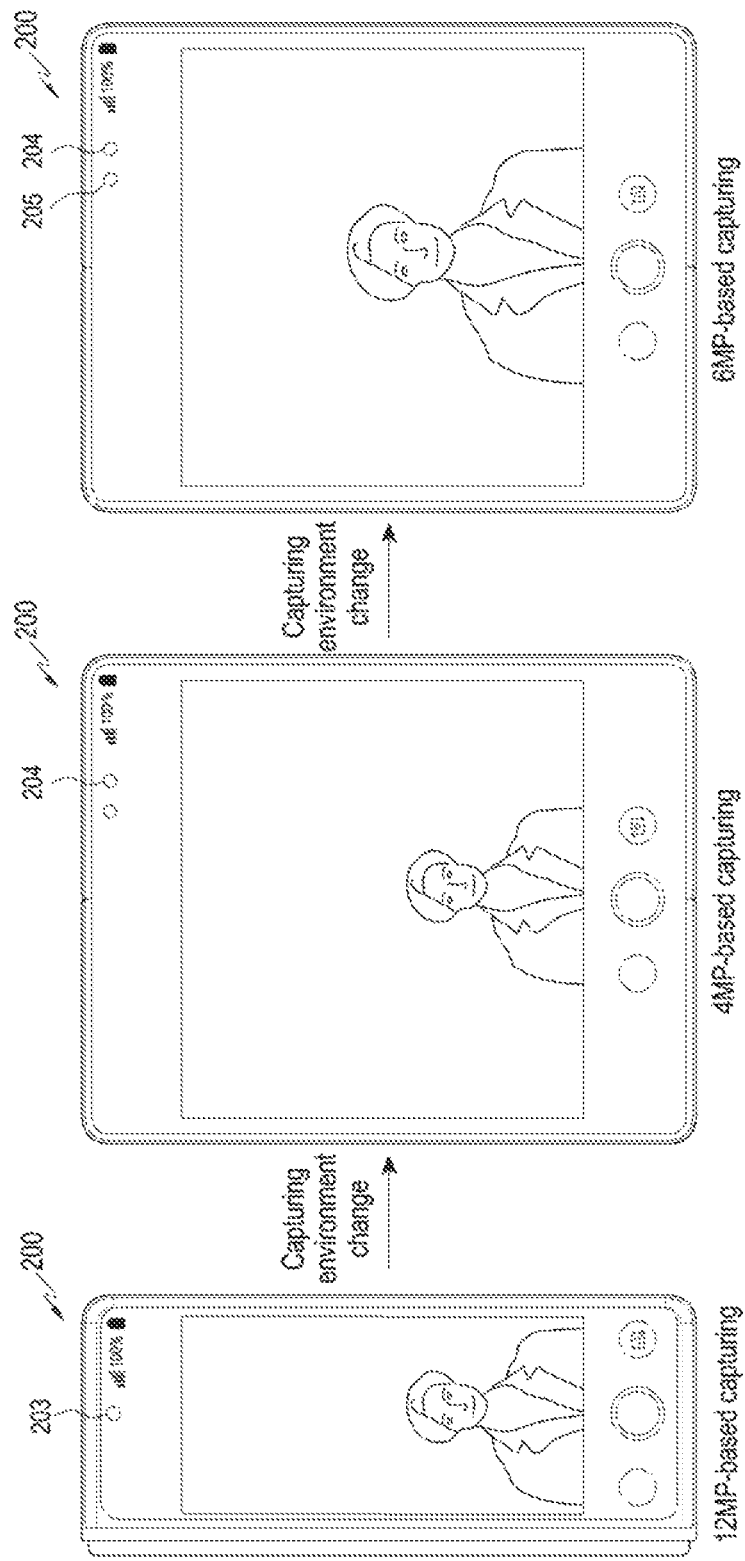

FIGS. 10 and 11 are example diagrams illustrating, when a portable device includes three or more cameras, a function or an operation of executing an application based on a specification of each of the three or more cameras according to a change in a capturing environment even when a request for providing camera specification information according to single camera identification information is obtained from the application, according to an embodiment of the disclosure.

Referring to FIG. 10, in operation 1010, the electronic device 101 according to an embodiment of the disclosure may obtain an image, based on a first specification of the first camera 203.

In operation 1020, the electronic device 101 according to an embodiment of the disclosure may identify a change in a capturing environment of the electronic device 101. The capturing environment according to an embodiment of the disclosure may include at least one of whether the electronic device 101 is in a folded state or an unfolded state, illuminance around the electronic device 101, or a zoom configuration of the first camera 203 or the second camera 204. Through operation 1020, the electronic device 101 according to an embodiment of the disclosure may identify a camera in an active state (e.g., an enabled state) or a camera which is to be in an active state.

In operation 1030, when the electronic device 101 is changed from a folded state to an unfolded status, the electronic device 101 according to an embodiment of the disclosure may obtain an image, based on a second specification of the second camera 204 by using the second camera 204. For example, the electronic device 101 according to an embodiment of the disclosure may obtain a 4-megapixel-based image. In operation 1030, the electronic device 101 according to an embodiment of the disclosure may further perform a function or an operation of identifying a specification supported by the second camera 204.

In operation 1040, the electronic device 101 according to an embodiment of the disclosure may identify another change in the capturing environment while obtaining the image based on the second specification. For example, the electronic device 101 according to an embodiment of the disclosure may identify obtaining of a user's input for obtaining an image by using a third camera 205 (e.g., a telephoto camera).

In operation 1050, the electronic device 101 according to an embodiment of the disclosure may obtain an image, based on a third specification of the third camera 205. For example, when the third camera 205 is a camera supporting 6 megapixels, the electronic device 101 according to an embodiment of the disclosure may obtain an image, based on a 6-megapixel camera. In operation 1050, the electronic device 101 according to an embodiment of the disclosure may further perform a function or an operation of identifying a specification supported by the third camera 205.

Figure 12:
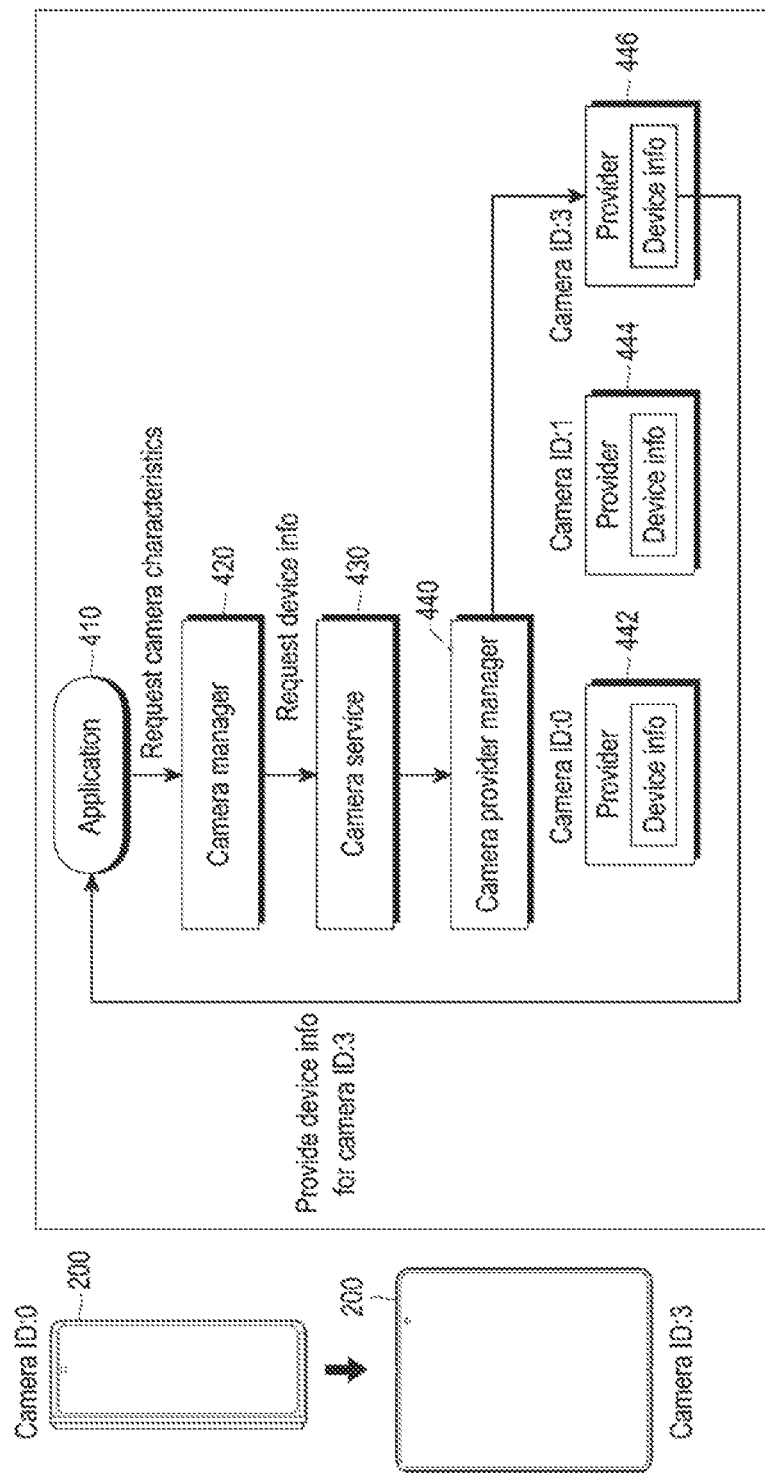
FIG. 12 is an example diagram illustrating a function or an operation in which information on a specification of a specific camera is provided to an application according to an embodiment of the disclosure.

FIG. 12 is an example diagram illustrating a function or an operation in which information on a specification of a specific camera is provided to an application according to an embodiment of the disclosure.

According to an embodiment of the disclosure, as shown in FIG. 12, when it is identified that a state of the portable device 200 is changed, the application 410 may request (e.g., query) camera characteristics from the camera manager module 420. In this case, the query may include camera identification information (e.g., "0" as camera identification information) stored in association with the application 412. According to an embodiment of the disclosure, the camera manager module 420 having been requested for the camera characteristics may request the camera service module 430 to provide information (e.g., device info) on a camera specification. According to an embodiment of the disclosure, the camera service module 430 having been requested to provide the information (e.g., device info) on the camera specification may request the camera provider manager module 440 to provide the information (e.g., device info) on the camera specification. However, in this case, although the camera identification information requested from the application 410 is "0", among the first provider module 442 configured to provide a camera specification corresponding to "0" as camera identification information, the second provider module 444 configured to provide a camera specification corresponding to "1" as camera identification information, and the third provider module 446 configured to provide a camera specification corresponding to "3" as camera identification information, the camera provider manager module 440 may request the third provider module 446 to provide the information (e.g., device info) on the camera specification, based on a current state (e.g., an unfolded state) of a terminal. In this case, the first provider module 442 having been requested to provide the information (e.g., device info) on the camera specification may provide, to the application 410, information on a camera specification corresponding to "3" as physical camera identification information. As such, as a camera which obtains an image has been changed (e.g., changed from the first camera 203 to the second camera 204), information on a specification of a camera (e.g., the second camera 204) currently obtaining an image may be provided to the application 410 having queried the information on the camera specification.

An electronic device 101 (e.g., a portable device 200) according to an embodiment of the disclosure may include a first camera 203 and a second camera 204, a memory 130, and at least one processor 120, wherein the at least one processor 120 is configured to obtain a request for execution of an application 412, in response to the request for the execution, obtain a query requesting provision of information on a first specification of the first camera 203, in response to obtaining the query, determine whether the first camera 203 and the second camera 204 are cameras having different specifications from each other, identify a capturing environment related to the electronic device 101, based on a result of the determination, obtain, from the memory, the information on the first specification of the first camera 203 or information on a second specification of the second camera 204, the information being related to the execution of the application 410, based on a result of the identification of the capturing environment, and execute the application 410 by providing the obtained information on the first specification or the obtained information on the second specification to the application 410.

An electronic device according to another embodiment of the disclosure may include a first camera 203 and a second camera 204, a memory 130, and at least one processor 120, wherein the at least one processor 120 is configured to identify that a capturing environment of the electronic device 101 is changed from a first environment to a second environment while an application using a first specification of the first camera 203 is executed, compare the first specification of the first camera 203 and the second specification of the second camera 204, and execute the application by providing information on the second specification of the second camera 204 from the memory to the application, based on a result of the comparison.

A method for controlling an electronic device 101 according to an embodiment of the disclosure may include obtaining a request for execution of an application, in response to the request for the execution, obtaining a query requesting provision of information on a first specification of a first camera of the electronic device, in response to obtaining the query, determining whether the first camera 203 and a second camera 204 of the electronic device are cameras having different specifications from each other, identifying a capturing environment related to the electronic device, based on a result of the determination, obtaining, from a memory of the electronic device, the information on the first specification of the first camera 203 or information on a second specification of the second camera 204, the information being related to the execution of the application, based on a result of the identification of the capturing environment, and executing the application by providing the obtained information on the first specification or the obtained information on the second specification to the application.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first camera;
   a second camera;
   at least one processor, and
   memory storing instructions,
   wherein the instructions, when executed by the at least one processor, cause the electronic device to:
   based on a request for execution of an application, obtain a query requesting information on a first specification of the first camera,
   based on obtaining the query, identify whether the first camera and the second camera have specifications that are different from each other,
   identify a capturing environment related to the electronic device, based on a result of the identification of whether the first camera and the second camera have specifications that are different from each other,
   based on a result of the identification of the capturing environment, obtain, from the memory, the information on the first specification of the first camera or information on a second specification of the second camera, the obtained information being related to the execution of the application, and
   execute the application by providing the obtained information on the first specification or the obtained information on the second specification to the application.

2. The electronic device of claim 1, wherein the instructions, when executed by the at least one processor, cause the electronic device to, based on identifying that the first camera and the second camera have specifications that are the same as each other, provide the information on the first specification of the first camera to the application.

3. The electronic device of claim 1, wherein the instructions, when executed by the at least one processor, cause the electronic device to, based on identifying that the first camera and the second camera have specifications that are different from each other, provide the information on the second specification of the second camera to the application.

4. The electronic device of claim 1, wherein the first camera and the second camera are grouped by a same identifier.

5. The electronic device of claim 1, wherein the capturing environment comprises at least one of whether the electronic device is in a folded state or an unfolded state, positions of the first camera and the second camera configured to rotate, illuminance around the electronic device, or a zoom configuration of the first camera or the second camera.

6. The electronic device of claim 5, wherein the instructions, when executed by the at least one processor, cause the electronic device to:
   based the electronic device being in the folded state, execute the application based on the first specification of the first camera,
   based on the electronic device being in the unfolded state, execute the application based on the second specification of the second camera, and
   based on the first camera facing a capturing surface, execute the application based on the first specification.

7. The electronic device of claim 6, wherein the instructions, when executed by the at least one processor, cause the electronic device to, based on the electronic device being changed from the folded state to the unfolded state, obtain an image by using the second specification through the second camera, and upscale the image obtained by using the second specification to correspond to the first specification.

8. The electronic device of claim 1, wherein the electronic device further comprises a third camera, and
   wherein the instructions, when executed by the at least one processor, cause the electronic device to, based on an input for switching to the third camera being received while the application is executed based on the second specification of the second camera, execute the application according to a third specification of the third camera.

9. An electronic device comprising:
   a first camera;
   a second camera;
   at least one processor, and
   memory storing instructions,
   wherein the instructions, when executed by the at least one processor, cause the electronic device to:
   identify, while an application using a first specification of the first camera is executed, that a capturing environment of the electronic device is changed from a first environment to a second environment,
   compare the first specification of the first camera and a second specification of the second camera, and
   based on a result of the comparison, execute the application by providing information on the second specification of the second camera from the memory to the application.

10. The electronic device of claim 9, wherein the instructions, when executed by the at least one processor, cause the electronic device to, based on the result of the comparison indicating that the first specification and the second specification are different from each other, provide the information on the second specification of the second camera to the application.

11. The electronic device of claim 9, wherein the first environment comprises the electronic device being in a folded state, and
   the second environment comprises the electronic device being in an unfolded state.

12. The electronic device of claim 9, wherein the first camera and the second camera are grouped by a same identifier.

13. The electronic device of claim 9, wherein the instructions, when executed by the at least one processor, cause the electronic device to determine whether the application can be executed according to the second specification.

14. A non-transitory storage medium storing one or more programs, the one or more programs comprising computer-executable instructions, when executed by at least one processor of an electronic device, cause the electronic device to:
obtain a request for execution of an application;
based on obtaining the request for the execution, obtain a query requesting provision of information on a first specification of a first camera of the electronic device;
based on obtaining the query, identify whether the first camera and a second camera of the electronic device have specifications that are different from each other;
based on a result of the identifying whether the first camera and the second camera have specifications that are different from each other, identify a capturing environment related to the electronic device;
based on a result of the identification of the capturing environment, obtain, from memory of the electronic device, the information on the first specification of the first camera or information on a second specification of the second camera, the obtained information being related to the execution of the application; and
execute the application by providing the obtained information on the first specification or the obtained information on the second specification to the application.

15. The non-transitory storage medium of claim 14, wherein the instructions, when executed by the at least one processor of the electronic device, cause the electronic device to based on identifying that the first camera and the second camera have specifications that are the same as each other, provide the information on the first specification of the first camera to the application.

16. The non-transitory storage medium of claim 14, wherein the instructions, when executed by the at least one processor of the electronic device, cause the electronic device to based on identifying that the first camera and the second camera have specifications that are different from each other, provide the information on the second specification of the second camera to the application.

17. The non-transitory storage medium of claim 14, wherein the first camera and the second camera are grouped by a same identifier.

18. The non-transitory storage medium of claim 14, wherein the capturing environment comprises at least one of whether the electronic device is in a folded state or an unfolded state, illuminance around the electronic device, or a zoom configuration of the first camera or the second camera.

19. The non-transitory storage medium of claim 18, wherein the instructions, when executed by the at least one processor of the electronic device, cause the electronic device to:
based on the electronic device being in the folded state, execute the application based on the first specification of the first camera, and
based on the electronic device being in the unfolded state, execute the application based on the second specification of the second camera.

20. The non-transitory storage medium of claim 18, wherein the instructions, when executed by the at least one processor of the electronic device, cause the electronic device to based on the electronic device being changed from the folded state to the unfolded state, obtain an image by using the second specification through the second camera, and upscale the image obtained by using the second specification to correspond to the first specification.

* * * * *